March 7, 1939.  J. M. PEARSON  2,149,715

CORE ORIENTATION APPARATUS

Filed June 7, 1937

WITNESS:
Robt R Mitchel

INVENTOR
John M. Pearson
BY
Busser Harding
ATTORNEYS.

Patented Mar. 7, 1939

2,149,715

UNITED STATES PATENT OFFICE 2,149,715

CORE ORIENTATION APPARATUS

John M. Pearson, Swarthmore, Pa., assignor to Sperry-Sun Well Surveying Company, Philadelphia, Pa., a corporation of Delaware Application June 7, 1937, Serial No. 146,739

3 Claims. (Cl. 33—1)

This invention relates to an apparatus for determining the dip and strike of strata appearing in cores taken from a bore hole from data including the magnetic polarity or susceptibility of a core, the inclination and direction of the bore hole at the point where the core was taken, and other auxiliary information.

As described, for example, in Herrick Patent 1,792,639, dated February 17, 1931, it is possible to determine to a fair degree of accuracy the dip and strike of strata penetrated by a bore hole if measurements are made to ascertain the magnetic polarization of a core taken at the location of the strata.

The assumption, borne out by observations, is that in a magnetically polarized core, the axis of polarization originally coincided in direction and sense with the earth's field, and that in a core showing an axis of maximum susceptibility, that axis coincided in direction with the direction of the earth's field, though in the latter case the susceptibility axis is without sign.

In making such determinations, the magnetic polarity or axis of maximum susceptibility of the core is determined by means of an apparatus such as that disclosed in said Herrick patent, and the magnetic north or susceptibility axis of the core indicated thereon. By suitable measurements there can then be determined the apparent dip and strike of a bedding plane appearing in the core with respect to the magnetic north or susceptibility axis so indicated.

For simplicity of expression, the magnetic polarity, alone, will be usually referred to hereafter, though it will be understood that the axis of maximum susceptibility may be used instead of the axis of polarization, with the exception that the latter will give rise to two alternative results from which the true one must be chosen by reference to other information.

Obviously, however, the dips and strikes thus obtained are not the true ones and various other factors must be considered before there can be ascertained the actual value of the dips and strikes with respect to the true north. First there must be considered the direction of the bore hole, both in inclination and azimuth, and there must be further considered the magnetic dip of the earth's field at the location where the core was taken. It will be obvious from a casual consideration of the corrections necessary to the apparent dip and strike to secure the true dip and strike that the problem is mathematically complicated and that calculations would be quite subject to inadvertent errors due to mistakes in sign in taking into account the various corrections.

It is accordingly the object of the present invention to provide an apparatus on which the various data may be set up and which, after adjustments in accordance with the various data, will give a true indication of the dip and strike of the bedding plane shown in a magnetically anisotropic core, in which the magnetic anisotropy may take the form of polarization or antisotropic susceptibility. Attempts have been made heretofore to provide such apparatus, but magnetic dip was not taken into account and, while such apparatus would give fairly accurate results under some conditions, it was quite possible that by an unfortunate combination of circumstances involving the formation, the magnetic dip and the slope of the bore hole errors of considerable magnitude could arise in the determination of the dip and strike.

The above object and more specific objects of the invention, particularly relating to details, will be apparent from the following description read in conjunction with the accompanying drawing in which:

Figure 2 is a plan view of the same with certain parts in horizontal section;

Figure 3 is a fragmentary elevation of certain of the parts of the apparatus directly associated with the bedding plane plate;

Figure 4 is a fragmentary view showing the arrangement for setting up the value of the magnetic dip on the apparatus; and Figure 5 is a section taken on the plane indicated at 5—5 in Figure 1.

Figure 1:
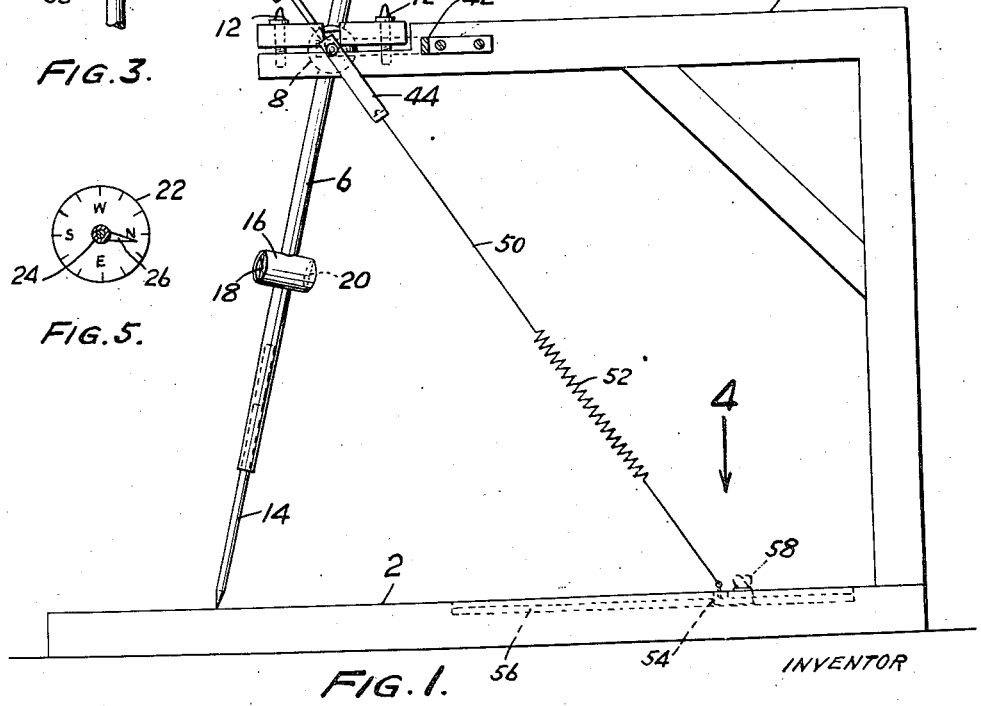
Figure 1 is a side elevation, partly in section, showing the improved type of orientation apparatus.

The apparatus comprises a rigid supporting structure consisting of a horizontal base plate 2 and a bracket 4 secured thereto. The bracket 4 supports a spindle 6, representing the axis of a bore hole, by means of a ball and socket joint indicated at 8 and comprising a ball member secured to the spindle 6 resting in a spherical depression in the bracket 4 and arranged to be clamped therein by means of a plate 10 having a cooperating spherical depression and arranged to clamp the spindle 6 in adjusted position by means of clamp screws 12. The arrangement is such that when the spindle 6 is at right angles to the upper surface of the base plate 2 it is truly vertical. While the necessity for this is not imposed by the apparatus, it is desirable that this be the case, because in the ultimate determination of the dip and strike of the bedding plane, it is convenient to use a level in known fashion. The use of such level depends upon the verticality of the spindle 6 when in its origin position.

The lower end of the spindle 6 is provided with an extension rod 14 having a pointed lower end designed to cooperate with a scale 13, graduated as indicated, to show both the inclination of the spindle 6 and the azimuth of the inclination with respect to magnetic north.

The spindle 6 carries a sight tube 16 which is provided with two cross-hairs 18 and 20 arranged parallel to the axis of the spindle and in a common plane including the axis of the spindle. These cross-hairs are adapted to be aligned with a wire 50 in the adjustment of the instrument, as will be hereafter apparent.

Above the mounting 8 the spindle 6 carries a fixed protractor plate 22, while above this plate there is mounted on the spindle for rotation about its axis a sleeve 24 carrying a pointer 26 cooperating with the graduations on the plate 22, which sleeve is adapted to be clamped in adjusted position by means of a thumb screw 28. The north marking on the plate 22 lies in the plane defined by the cross-hairs 18 and 20. The sleeve 24 at its upper end carries a protractor 32 pivoted to it at 30 and carrying a plate 34 which represents the bedding plane of the strata shown in a core. In order to read the inclination of the protractor 32 relative to the axis of the spindle 6, there is provided a pointer 36, preferably of a spring type, secured to the sleeve 24 at 38 and arranged to be clamped by means of a thumb screw 40 against the protractor 32 to hold it in adjusted position.

Brackets 42 support a yoke 44 for rotation about an axis passing horizontally through the center of universal support of the spindle 6. The mounting is preferably provided by removable screws so that, if occasion requires, the yoke may be removed. The yoke is counter-weighted, as indicated at 48, and provides an anchor for the upper end of a wire 50 which is connected through a tensioning spring 52 to a slide 54 mounted in a guideway 56 in the base 2 and arranged to be clamped in adjusted position therein by means of a screw 58. The center line of guideway 56 passes through the vertical line through the center of support of the spindle 6 and represents the direction of the horizontal component of the earth's magnetic field, magnetic north being to the right, as indicated in Figure 1. The axis of support of yoke 44 is perpendicular to a vertical plane through the center line of the guideway 56. The arrangement is such that the wire 50 extends along a line from the center of the groove 56 to the center of support of the spindle 6 so as to represent the actual direction of the magnetic field in both azimuth and dip, when the upper plane surface of the base 2 represents a horizontal plane at the location where the core under consideration was taken.

Since the line of the wire 50 and the axis of the spindle 6 will intersect in the center of support of the spindle, it will always be possible to align the cross-hairs 18 and 20 and the wire 50 by rotation of spindle 6 about its axis. Assuming that the spindle is located by adjustment of the point of the member 14 on the scale 13 so that its inclination and azimuth with respect to the horizontal plane represented by the upper surface of base 2 and the magnetic north, represented by the center line of slot 56, will correspond to the values for a portion of a bore hole from which a core is taken, it will be clear that when the cross-hairs 18 and 20 and the wire 50 are aligned the representation of the component perpendicular to the axis of the bore hole of the magnetization of a core taken from such portion of a bore hole will necessarily lie in the plane defined by the axis of the spindle 6 and the wire 50, which will be the plane defined by the two cross-hairs 18 and 20. The north marking on the plate 22, being in the plane of the cross-hairs, will represent the direction of such component of the core's magnetic field. The assumption is made, necessary in this procedure, that the polarization (or axis of maximum susceptibility) of the core corresponds to the prevailing direction of the earth's magnetic field at the location where the core was taken.

In the use of the apparatus, the starting point is the data obtained from a magnetometer of the type indicated in the above mentioned Herrick patent. This will give the direction of the component of the magnetic field of the core perpendicular to the axis of the core, or, if the core is not polarized, the corresponding component of the axis of maximum susceptibility. There are also measured on the core the apparent dip and strike of a bedding plane shown in the core with respect to a plane perpendicular to the axis of the core and its magnetic north, or axis of maximum susceptibility.

Assuming a polarized core, the slide 54 is adjusted in its slot 56 so that the inclination of the wire 50, as indicated by the scale along the slot 56, corresponds to the dip of the earth's magnetic field at the location of the bore hole. Then the sleeve 24 is rotated to bring the pointer 26 in a position relative to the north indication on the plate 22 corresponding to the direction of dip of the bedding plane relative to the magnetic north of the core. With the sleeve secured in such position the protractor 32 is moved about its axis 30 so that the pointer 36 will indicate on its scale the dip of the bedding plane. The plate 34 will then represent in its relationship to the axis of spindle 6 and to the north marking of the plate 22 the position of the bedding plane with respect to the axis of the bore hole and the component of the polarization of the core normal to that axis.

The spindle 6 is then freed by manipulation of the thumb screws 12 and adjusted so that the extension pointer 14 will contact with a part of the scale 13 corresponding to the inclination and azimuth of inclination of the bore hole, the azimuth being that relative to the magnetic north at the location of the bore hole.

Then, while the axis of the spindle is maintained fixed, the spindle is rotated about its axis to line up the cross-hairs 18 and 20 with the wire 50, and the spindle is clamped in that position.

It will be obvious that the results of the above manipulations will be the location of the plate 34 in a position relative to the horizontal represented by the upper face of support 2 and the magnetic north-south line represented by the center line of slot 56 corresponding precisely to the position of the bedding plane in its original state in the earth with respect to the horizontal and also with respect to the horizontal component of the earth's magnetic field. Accordingly, it is only necessary to measure the position of the plate 34 with respect to the horizontal and with respect to the axis of the slot 56 in order to determine the true dip and strike of the bedding plane with respect to the magnetic north, which can then be corrected by using the known magnetic declination to give the dip and strike with respect to the true north.

As indicated above the present apparatus avoids any errors due to neglect of the magnetic dip, which may cause errors of considerable magnitude to arise in cases of substantial inclination of the bore hole in unfortunate directions, combined with equally unfortunate dips and strikes of bedding planes. Frequently the values of these factors are such as to cause them to cancel each other to an extent rendering negligible the error arising from neglect of magnetic dip; but that is not always the case, and the present invention is designed to obviate any errors which may arise in any instance.

In case of a core showing anisotropic susceptibility only, the determinations will be correspondingly made though in such case two possible results will be secured, one of which must be chosen on the basis of other information.

It will be obvious that various modifications in the embodiment of the invention may be made without departing from its scope; for example, the various markings may be made in other, but equivalent fashions, and mechanical details may also be substantially changed.

What I claim and desire to protect by Letters Patent is:

1. Apparatus for the determination of the dip and strike of a bedding plane indicated in a magnetically anisotropic core taken from a bore hole, said apparatus comprising means defining a horizontal plane at the position where the core was taken, means defining the azimuth and dip at said position of the earth's magnetic vector relative to said plane, means universally pivoted relative to said plane-defining means for defining relatively to the horizontal plane and magnetic vector the axis of the portion of the bore hole from which the core was taken, means defining relative to said universally pivoted means the axial plane containing the axis of magnetic anisotropy of the core, and means defining the bedding plane of the core relative to the axis of the bore hole and the last named plane, said various means being relatively adjustable for the representation of the data belonging to different cores and to represent the earth's magnetic vector in said axial plane containing the axis of magnetic anisotropy of each core, whereby the relationship of said means defining the bedding plane and said means defining a horizontal plane and the earth's magnetic vector may be made to represent a relationship of the bedding plane to the earth.

2. Apparatus for the determination of the dip and strike of a bedding plane indicated in a magnetically anisotropic core taken from a bore hole, said apparatus comprising a support having means for representation of a horizontal plane at the position where the core was taken, and also of the direction of the horizontal component of the earth's magnetic field thereat, a member universally pivoted on said support and adjustable to represent relatively to the support the axis of the portion of the bore hole from which the core was taken, means on said member indicative of the direction of the component of the magnetic field of the earth perpendicular to the axis of the bore hole, means carried by the support marking a line extending through the pivot point of said member and in the direction of the earth's magnetic field relative to the reference data represented on the support, aligning means on said member to bring said indicated component of the magnetic field of the earth perpendicular to the axis of the bore hole into the plane defined by the axis of said member and the line marked by said marking means, and an element adjustable on said member to indicate the relationship of said bedding plane to the axis of said member and said indicated component of the magnetic field of the earth perpendicular to the axis of the bore hole, whereby the relationship of said element to the support may be made to represent the relationship of the bedding plane to the earth.

3. Apparatus for the determination of the dip and strike of a bedding plane indicated in a magnetically anisotropic core taken from a bore hole, said apparatus comprising a support having means for representation of a horizontal plane at the position where the core was taken, and also of the direction of the horizontal component of the earth's magnetic field thereat, a member universally pivoted on said support and adjustable to represent relatively to the support the axis of the portion of the bore hole from which the core was taken, means on said member indicative of the direction of the component of the magnetic field of the earth perpendicular to the axis of the bore hole, means carried by the support marking a line extending through the pivot point of said member and in the direction of the earth's magnetic field relative to the reference data represented on the support, sighting means on said member for observing said line marking means to bring said indicated component of the magnetic field of the earth perpendicular to the axis of the bore hole into the plane defined by the axis of said member and the line marked by said marking means, and an element adjustable on said member to indicate the relationship of said bedding plane to the axis of said member and said indicated component of the magnetic field of the earth perpendicular to the axis of the bore hole, whereby the relationship of said element to the support may be made to represent the relationship of the bedding plane to the earth.

JOHN M. PEARSON.